Oct. 8, 1940.          F. R. BALCAR          2,217,429
SEPARATION OF ACETYLENE FROM GASEOUS MIXTURES CONTAINING IT
Filed March 25, 1937
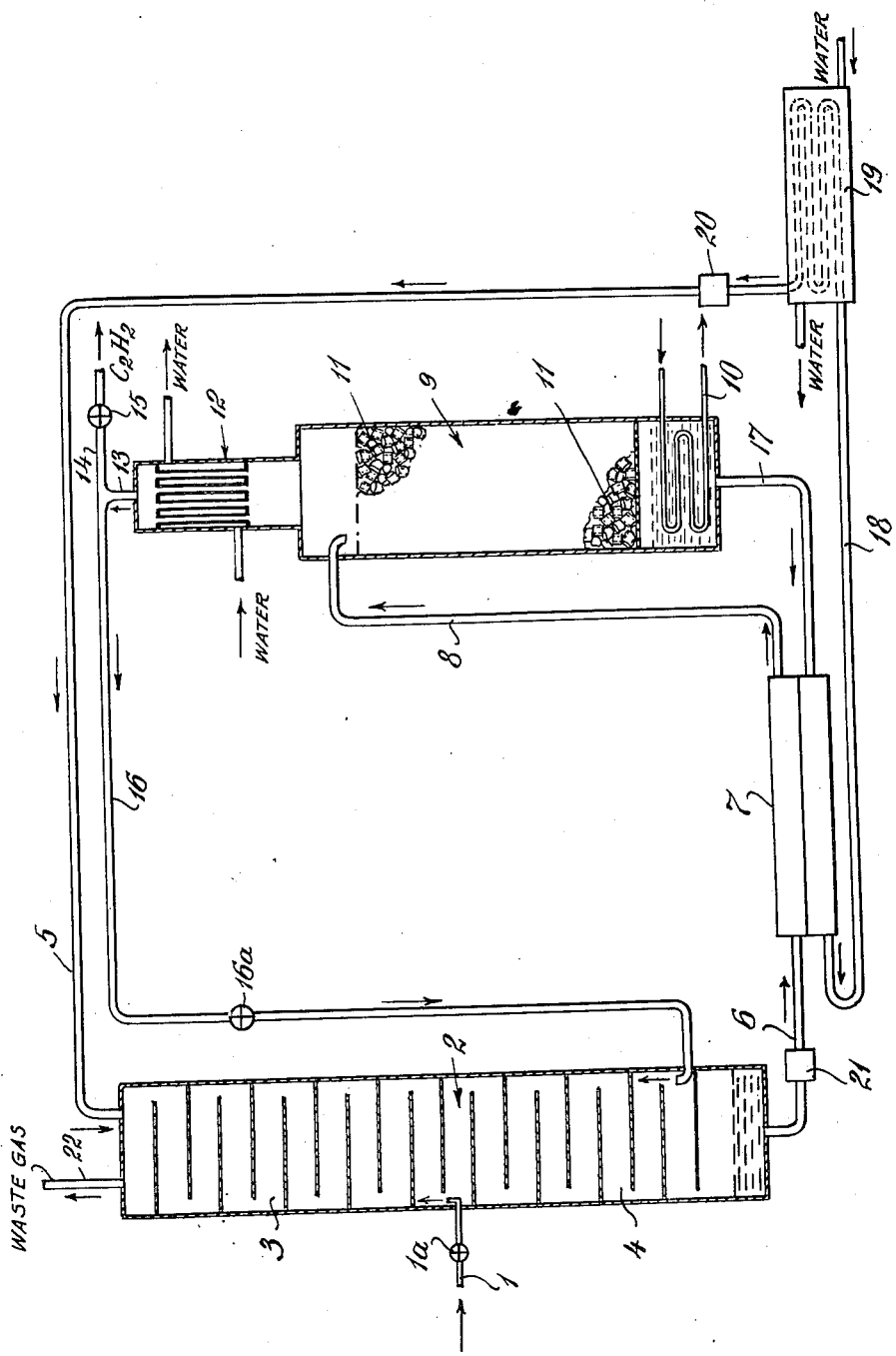
INVENTOR
Frederick R. Balcar
BY
Pennie Davis Marvin & Edmonds
ATTORNEYS Patented Oct. 8, 1940

2,217,429

UNITED STATES PATENT OFFICE 2,217,429

SEPARATION OF ACETYLENE FROM GASEOUS MIXTURES CONTAINING IT

Frederick R. Balcar, Stamford, Conn., assignor to Air Reduction Company, Incorporated, New York, N. Y., a corporation of New York Application March 25, 1937, Serial No. 132,950

2 Claims. (Cl. 260—679)

This invention relates to a process for the recovery of acetylene in substantial purity from gaseous mixtures containing it as one of the components.

One well known gaseous mixture containing acetylene is derived from petroleum gases or liquids by subjecting them to a high temperature for a brief period of time. This operation is known familiarly as "cracking" and is described in detail in various articles and patents. The resulting gases vary widely in composition. They may contain, in addition to acetylene, carbon dioxide, carbon monoxide, methane, ethylene, hydrogen, nitrogen, etc. The invention as hereinafter described facilitates the recovery of acetylene from gaseous mixtures obtained by "cracking" or otherwise.

It has been known that acetylene may be recovered from gaseous mixtures containing it by means of the physical process known as selective absorption or solution of the acetylene in various liquids in which it is highly and preferentially absorbed. One of the best known solvents for acetylene is acetone or dimethyl ketone which is liquid at ordinary atmospheric temperatures and dissolves large volumes of acetylene at one atmosphere acetylene-pressure and, more at higher acetylene pressures. Acetone, however, is now considered to be inferior for this purpose to other liquid solvents. Its main disadvantage when utilized as a selective absorbent for acetylene is that even at atmospheric temperatures its vapor pressure is sufficiently high to cause serious losses when the dissolved acetylene is evaporated therefrom by heating.

In U. S. Patent No. 1,854,141 to G. F. Horsley, "Removal of acetylene from gases," a number of absorbent liquids suitable for solution of acetylene are described. This patent also states very clearly the ideal qualities of a solvent to be used for separating acetylene selectively from a gaseous mixture:

"1. High solubility for acetylene with low solubility for other gases.

"2. High boiling point and low vapor pressure at ordinary temperatures.

"3. Low viscosity in order to ensure efficient wetting of the packing in an absorption tower.

"4. Stability at the boiling point.

"5. No chemical reaction with acetylene or other gases such as methane or olefines, etc."

A large number of substances have been patented for use as acetylene absorbents, for example, see U. S. Patents No. 1,996,088, 1,854,141, and 1,900,655. In the process forming the subject matter of the present invention any one or a plurality of these substances having the properties above quoted may be utilized. For example, diethyl carbonate has proved to be very satisfactory and is preferred. Other satisfactory solvents for use in the process as hereinafter described are methyl ethyl ketone, methyl normal propyl ketone, ethers of ethylene glycol, diethylene glycol, etc.

It is the object of the present invention to afford an improved and highly efficient process for separating acetylene from gaseous mixtures containing it by utilizing solvents of the character described for absorption with continuous purification and release of the absorbed acetylene to permit recirculation of the solvent.

Other objects and advantages of the invention will be apparent as it is better understood by reference to the following specification and accompanying drawing, in which an arrangement of apparatus adapted for the practice of the invention is illustrated diagrammatically. It is to be understood that this arrangement is subject to numerous modifications and that the invention is not limited thereby.

The general principles of the invention rest upon the selective absorption of acetylene from the gaseous mixture in a suitable solvent, followed by treatment of the liquid with a portion of the gases derived from the subsequent heating of the liquid. This treatment of the liquid solvent containing dissolved acetylene in the purifier stage removes effectively most or all of the less soluble gases which may be dissolved initially with the acetylene. Thus, when the solvent is finally heated to separate acetylene therefrom, the gas discharged is substantially free from admixture of other and undesirable gases. The invention also contemplates regulation of the quantity of acetylene returned to the purifier, so that an acetylene of the desired purity constitutes the vapor entering at the bottom of the purifier stage. This, it is found, ensures satisfactory conditions of operation.

Referring to the drawing, the mixture containing acetylene, either uncompressed or compressed to a few atmospheres, enters through pipe 1 and valve 1A at an intermediate level of a combined absorber-purifier 2. This is a tower containing pans, trays, or ferrules of any suitable type. From the level of admission, the gaseous mixture ascends in the upper portion 3 of the apparatus 2, which we shall call the absorber, coming into contact therein with the descending liquid solvent. The descending liquid solvent, when admitted at the top through pipe 5, is an effective solvent for acetylene having the characteristics mentioned in U. S. Patent No. 1,854,414, such as diethyl carbonate $(C_2H_5)_2CO_3$.

The two streams of ascending vapor and descending liquid in absorber 3 act upon each other in a well known manner, that is, in a manner such that the descending liquid, diethyl carbonate, dissolves or becomes enriched in the more soluble constituents of the entering gaseous mixture, particularly acetylene, while the ascending vapor becomes enriched in the less soluble constituents of the mixture such as carbon dioxide, nitrogen, ethylene, etc. The effect upon the liquid as stated is a result of the specific property of acetylene of dissolving to a high degree in the liquid diethyl carbonate. The descending liquid therefore, by the time it reaches the bottom level of the absorber 3 where the gaseous mixture to be treated enters the latter, will be more or less saturated with acetylene gas under the partial pressure exerted by the acetylene gas at that level. It will also contain, of course, other volatile constituents of the entering mixture such as carbon dioxide and ethylene although much less of these gases dissolves in the liquid at a given partial pressure than is the case for acetylene.

At the level at which the gaseous mixture to be treated is admitted, the latter joins and is mixed with a vapor coming from the bottom portion 4 of apparatus 2, which we shall call the purifier. It is these two combined vapors that ascend in the absorber 3. In the purifier 4 the acetylene becomes concentrated in the liquid descending while impurities dissolved in the liquid such as carbon dioxide and ethylene are driven out of it, by the action of the ascending vapor upon that liquid.

The ascending vapor in the purifier 4 and also the absorbing liquid, diethyl carbonate, entering the top level of the apparatus 2, originate as a result of subsequent treatment of the liquid reaching the extreme bottom of the purifier 4. This liquid product of the purifier passes through a pipe 6 and pump 21 thence through a heat exchanger 7 wherein it is heated by thermal contact with the other liquid passing through exchanger 7. From exchanger 7 it is conducted through a pipe 8 to the upper portion of a selective evaporator 9 provided with a heating coil 10 at the bottom thereof and pans, trays or ferrules 11 by means of which this liquid is brought into intimate contact with the vapor arising from the bottom of said selective evaporator 9. The action of heating coil 10 results in the boiling out from the liquid entering through 8 of all the volatile constituents contained therein, for example, acetylene $(C_2H_2)$ together with very small residues of carbon dioxide $(CO_2)$ and ethylene $(C_2H_4)$. These vapors ascend through trays or ferrules 11, then through a condenser or dephlegmator 12 cooled by water, and leave the latter by means of pipe 13.

A portion thereof, constituting the acetylene product of the separation, is diverted through pipe 14 controlled by valve 15 and is led to any convenient holder or container or to a compressor by means of which it is compressed into some suitable solvent liquid for storage such as acetone or diethyl carbonate, etc.

The remaining portion of the acetylene product is conducted through a pipe 16 and a valve 16a to the bottom level of the purifier 4 and as it ascends in contact with the descending liquid drives out the impurities such as carbon dioxide, ethylene, etc., and dissolves in the liquid in their place. This vapor when it reaches the intermediate level of admission of the gas to be treated constitutes the upwardly ascending vapor in the purifier already referred to as the gas which mixes with the incoming gaseous mixture at the level of admission of the latter.

The liquid residue, almost pure diethyl carbonate, leaving the lowest level of the boiler 9 by means of the pipe 17, delivers part of its heat content to the liquid leaving the bottom level of purifier 4 by means of exchanger 7. The cooled liquid passes through the pipe 18 to the water cooler 19 and thence to the liquid pump 20, by means of which it is elevated through pipe 5 to the top level of the absorber 3. Pipe 22 carries the residual gaseous mixture leaving the system.

An important feature in the present process is that the separation of high purity acetylene from the mixture containing it is accomplished in a continuous operation. The absorber-purifier extends both above and below the level of admission of the mixture to be treated and it is this feature which permits the practically complete separation of acetylene in the pure state from the gaseous mixture.

The use of the purifier 4 makes it possible for the operator to adjust the quantity of liquid entering the top of the absorber 3 through pipe 5 to any desired quantity and particularly, to that quantity which gives optimum results, taking into account all factors such as purity of product, percent recovery, cost of power, etc. As a result of a comprehensive series of experiments I have found that the separation is accomplished advantageously when the relative quantity of gaseous mixture entering through pipe 1 and the absorbing liquid entering through pipe 5 are in such a ratio that the vapor entering apparatus 2 through pipe 1 contains about the same percentage of acetylene as does the vapor from the purifier 4 which mixes with it at that level. If we change the ratio of liquid entering through pipe 5 to vapor entering through pipe 1 so that it no longer has the value necessary to make this equality of acetylene percentages, the acetylene percentage in the gas ascending at the level of admission will no longer be equal to the acetylene percentage in the gas entering at that level. The equality of acetylene percentages may be maintained without interfering with the satisfactory operation of the process provided that the acetylene concentration in the mixed gas entering the absorption zone does not differ greatly from the concentration of the acetylene in the raw gas entering the system through the pipe 1.

The ratio of the volume of liquid fed to the top of the absorber to the volume of gas entering the absorber will vary with different solvents, depending on the solubility of acetylene in the solvent used. For a given apparatus and a given solvent it will vary depending on the extent to which the acetylene is to be recovered, and the degree of purity desired in the final product.

In general the pressures for the absorber-purifier, and the boiler, the particular solvent used, and the amount thereof cycled will be chosen so as to make the overall cost of the operation based on the quantity of acetylene produced a minimum, taking into account such factors as cost of compression, cost of heat supplied to the boiler, amount and value of solvent lost, value of the acetylene itself, etc.

The absorber-purifier may be operated at any convenient pressure, say from atmospheric pressure up to 20 atmospheres or more. The pressures in the boiler or selective evaporator may also be chosen arbitrarily to suit the requirements of the solvent employed, or the method of supplying heat to the solvent. In some cases, it would be possible to choose operating pressures sufficiently great for the solvent to be freed from its dissolved gases by release of pressure instead of adding heat to the solvent for that purpose. Also it may in some cases be desirable to release the solvent from pressure with the addition of heat to free the solvent from its dissolved gases. If the pressure chosen for the boiler is quite different from the operating pressure of the absorber-purifier, obviously some additional equipment such as pumps and pressure regulating valves will be required.

The level at which the acetylene containing gaseous mixture enters the absorber-purifier may be varied considerably. In general it may be said that the absorber must be sufficiently high or sufficient contact between liquid and vapor must be provided therein to prevent undue loss of acetylene in the waste gas, and the purifier must be high enough to give the stream of acetylene sufficient contact with the descending liquid to free it from dissolved carbon dioxide, ethylene, etc., to the desired extent.

Various changes may be made in the details of procedure and in the apparatus used without departing from the invention or sacrificing the advantages thereof.

I claim:

1. A cyclic method of recovering acetylene from gases containing the same which comprises selectively absorbing the acetylene in a liquid solvent in an absorption zone, passing the solvent and absorbed acetylene through a purifying zone, withdrawing the solvent and absorbed acetylene from the purifying zone, releasing acetylene from the withdrawn solvent, recycling the solvent from which acetylene has been released for absorption of further amounts of acetylene, re-cycling a portion of the released acetylene and bringing it into intimate contact with the solvent and absorbed acetylene in the purifying zone to remove gaseous impurities from the solvent containing absorbed acetylene, and mixing the released gaseous impurities and unabsorbed acetylene from the purifying zone with the gaseous mixture in the absorption zone, the amount of acetylene re-cycled to the purifying zone being substantially such that the concentration of acetylene in the gases from the purifying zone is substantially the same as the concentration of the acetylene in the gaseous mixture where said gases are combined.

2. A cyclic method of recovering acetylene from gases containing the same which comprises selectively absorbing the acetylene in a liquid solvent in an absorption zone, passing the solvent and absorbed acetylene through a purifying zone, withdrawing the solvent and absorbed acetylene from the purifying zone, releasing acetylene from the withdrawn solvent, recycling the solvent from which acetylene has been released for absorption of further amounts of acetylene, re-cycling a portion of the released acetylene and bringing it into intimate contact with the solvent and absorbed acetylene in the purifying zone to remove gaseous impurities from the solvent containing absorbed acetylene, and mixing the released gaseous impurities and unabsorbed acetylene from the purifying zone with the gaseous mixture in the absorption zone, the amount of acetylene re-cycled to the purifying zone being such that the concentration of acetylene in the resultant mixed gases entering the absorption zone is substantially the same as the concentration of acetylene in the gas fed to the system.

FREDERICK R. BALCAR.